INVENTOR
FREDRIC S. GRISTE
BY
ATTORNEY

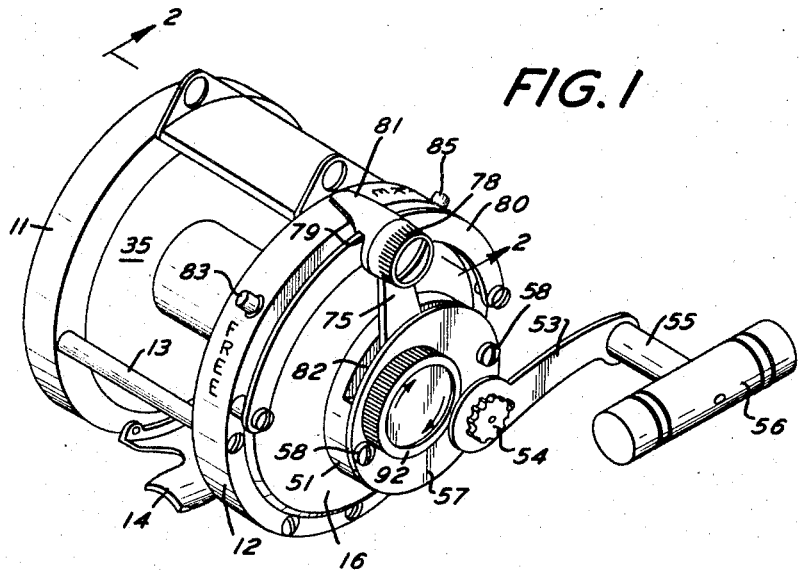
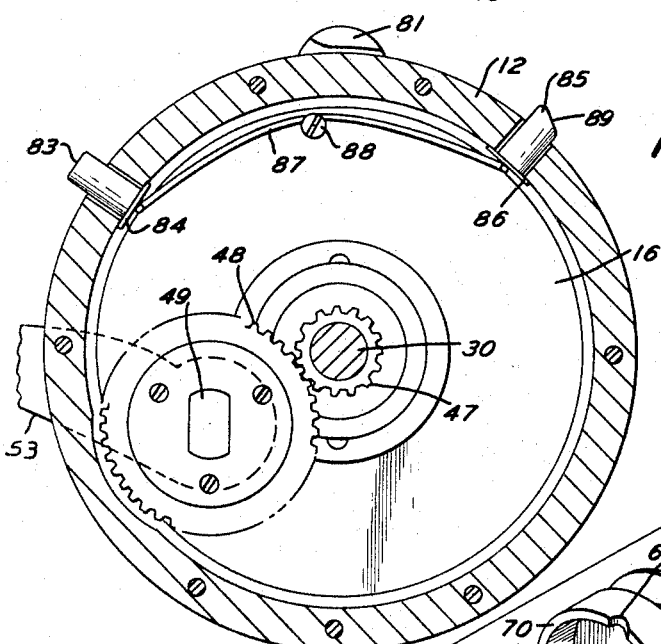
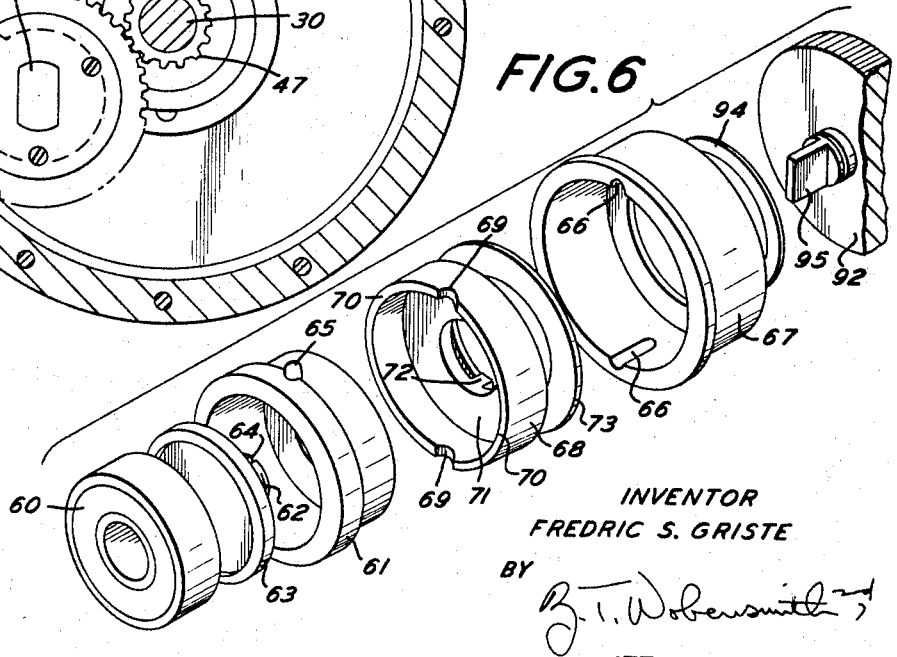

United States Patent Office 3,425,644
Patented Feb. 4, 1969

3,425,644
FISHING REEL WITH FRICTION DRAG
Fredric S. Griste, Drexel Hill, Pa., assignor to Penn Fishing Tackle Mfg. Co., Philadelphia, Pa., a corporation of Pennsylvania
Filed Aug. 19, 1965, Ser. No. 481,022
U.S. Cl. 242—84.45　　　　　　　　　　　　7 Claims
Int. Cl. A01k 89/04

ABSTRACT OF THE DISCLOSURE

A fishing reel having a spool supported between spaced side housings on a shaft. The spool is axially shifted relative to a friction plate in the left side housing by cam means in the right side housing which cam means is regulated by a lever operating over a normal range between two stop pins. The stop pins are yieldably mounted to be overridden by a specially designed head on said lever to provide movement of the lever beyond said normal range for complete withdrawal of the spool from the plate for free spool casting or maximum force connection of the spool against the friction plate. A center knob axially retained on the lever is rotatable to change the normal range of spool shifting by the lever acting between the stops.

---

This invention relates to fishing reels.

It is important in the use of fishing reels that adequate provisions be made for free spooling for playing out the line, for controlled braking for slowing and stopping the spool as desired and for rewinding. It has heretofore been proposed to employ a manually rotatable or star wheel for controlling the brake setting.

It is the principle object of the present invention to provide a fishing reel having a positive control of brake application with a predetermined location for free spool action and a predetermined and indicated range for brake control.

It is a further object of the present invention to provide a fishing reel with a manually accessible brake control lever movable to a positive location for free spooling and in a predetermined range for brake control.

It is a further object of the present invention to provide a fishing reel of the character aforesaid having brake range presetting mechanism.

It is a further object of the present invention to provide a fishing reel of the character aforesaid which is rugged and free from operating difficulties.

Other objects and advantageous features of the invention will be apparent from the description and claims.

The nature and characteristic features of the invention will be more readily understood from the following description taken in connection with the accompanying drawings forming part thereof, in which:

FIGURE 1 is a view in perspective of a fishing reel in accordance with the invention;

FIG. 5 is a vertical sectional view taken approximately on the line 5—5 of FIG. 2; and FIG. 6 is an exploded perspective view of a portion of the control structure shown in FIG. 3.

Figure 2:
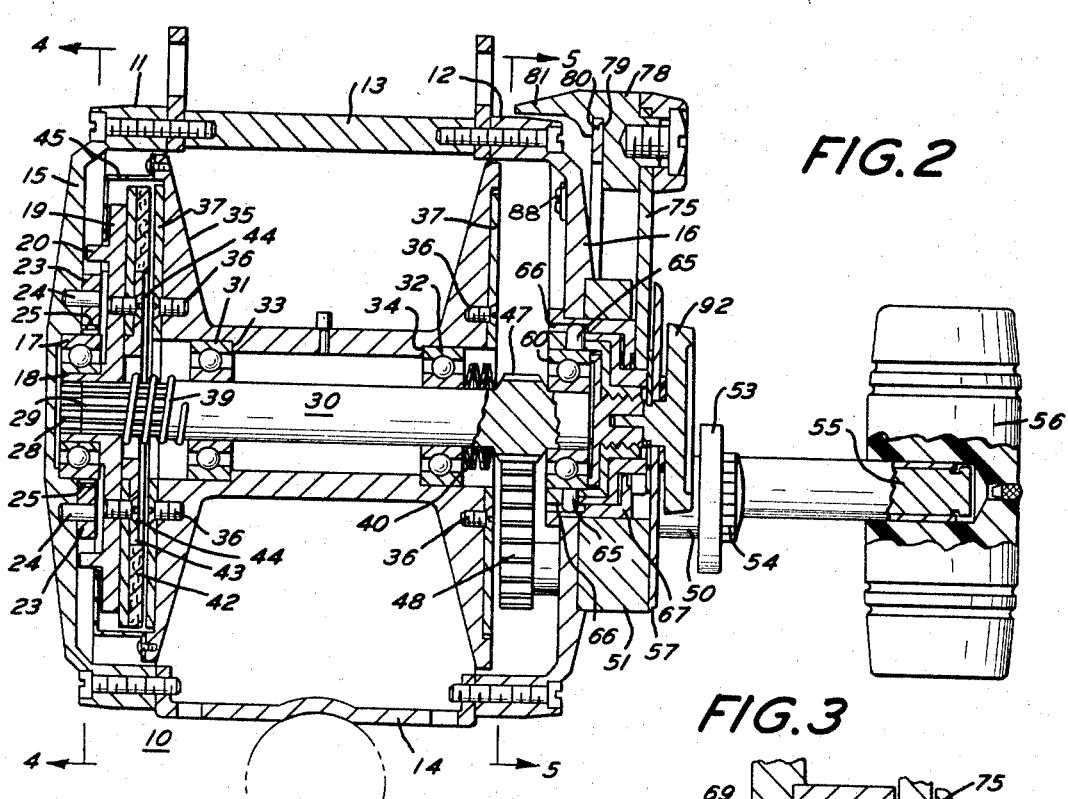
FIG. 2 is a transverse sectional view, enlarged, taken approximately on the line 2—2 of FIG. 1.
Figure 4:
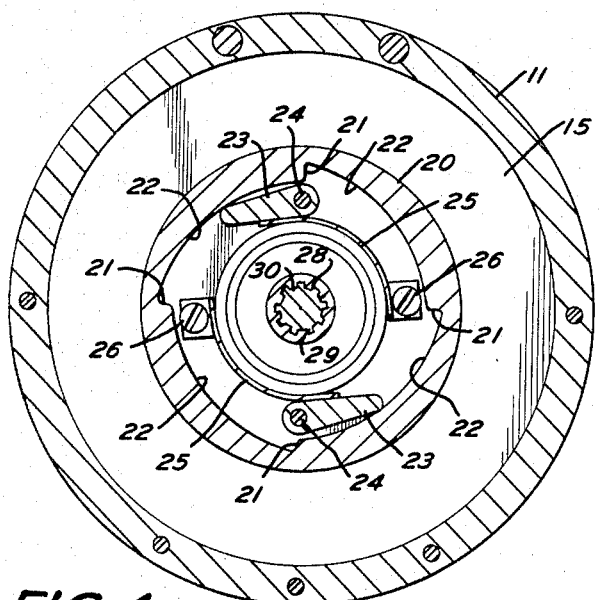
FIG. 4 is a vertical sectional view taken approximately on the line 4—4 of FIG. 2.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings in which a preferred embodiment of the invention is illustrated a reel frame is shown at 10 having side rings 11 and 12 connected by frame posts 13, and with a reel stand 14 carried thereby. The side rings 11 and 12 have integral therewith side plates 15 and 16.

The side plate 15 has a bearing 17 carried thereby which supports the hub 18 of a drive plate 19. The drive plate 19, on the same side thereof as the hub 18 has a side rim 20 provided with a plurality of interior peripheral shoulders 21 with guide surfaces 22 therebetween.

The side plate 15 on the interior thereof has a plurality of dogs 23 carried on pivot pins 24, and normally urged outwardly by springs 25 which extend around the outside of the bearing 17 and are clamped in place by screws 26.

The drive plate 19 has interior splines 28 for slidable engagement by complemental splines 29 of a shaft 30. The shaft 30 has, at spaced locations thereon, spool supporting bearings 31 and 32 which engage internal shoulders 33 and 34 of a spool 35. The spool 35 has secured on each end face thereof by screws 36, a drag washer 37, of friction material. The spool 35, by reason of the washers 37 at both ends can be turned end for end upon the occurrence of wear of one of the washers 37.

A helical spring 39 is interposed between the drive plate 19 and the bearing 31 and a spring 40, which may be of the Belleville spring washer type, engages the bearing 32.

The drive plate 19 has a drag washer 42 of friction material carried thereby for engagement with the contiguous drag washer 37. The washer 42 is positioned by a collar 43 which is secured to the plate 19 by screws 44.

A drag cover ring 45 can be provided carried by the spool 35.

The shaft 30 has an integral pinion 47 with which a gear 48 on a drive shaft 49 is in engagement. The drive shaft 49 is journaled in a sleeve 50 in a bridge extension 51. The shaft 49, on the outer end thereof, has a radial handle 53 secured by a stud 54 and which carries an operating rod 55 on which a manually operable knob 56 is pivotally supported. A bridge cover plate 57 is held in place on the outer face of the bridge extension 51 by screws 58.

Figure 3:
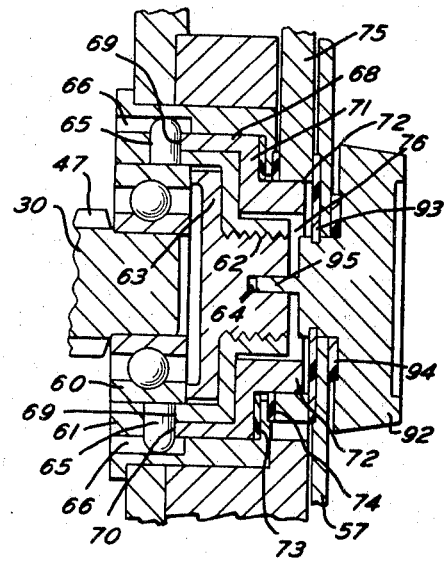
FIG. 3 is a fragmentary view, still further enlarged, of a portion of FIG. 2.

The longitudinal axial position of the shaft 30 and accordingly of the spool is controlled by the structure to be described and which is shown in detail in FIGS. 3 and 6. The end of the shaft 30, outwardly beyond the pinion 47, is carried in a bearing 60.

The bearing 60 is adjustably seated within a bearing carrier 61 which has interiorly disposed therein in threaded engagement at 62 a bearing positioning head 63. The head 63 has an end slot 64 for adjustment thereof.

The bearing carrier 61 has oppositely disposed radial cam follower pins 65 which are slidable in grooves 66 in a cam housing 67.

The cam housing 67 has mounted therein a cylindrical cam 68 with opposite notches 69 for receiving the pins 65 in free spool position and with cam faces 70 extending therefrom for braking.

The cam 68 has an end plate 71 with lugs 72 thereon with which a brake control lever 75 is in operating engagement. The lever 75 is retained in place in engagement with the lugs 72 by the bridge cover plate 57 and has a central opening 76 for access to the end slot 64.

Packing washers or gaskets 73 and 74 are preferably interposed between the cam 68 and the cam housing 67 and between the cam housing 67 and the bridge extension 51.

The outer end of the lever 75 has a guide head 78 with a slot 79 movable along an arcuate guide strip 80 carried on the side plate 16 and a stop finger 81. The bridge extension 51 has a cutout 82 to permit swinging movement of the lever 75.

The side plate 16 has a radially disposed free spool stop pin 83 mounted therein with an enlarged head 84 for limiting outward movement thereof and, circumferentially spaced with respect thereto, a radially disposed brake or strike stop pin 85 mounted thereon with an enlarged head 86 for limiting outward movement thereof. A spring 87, carried on a stud 88, bears at its ends on the heads 84 and 86 and normally urges the stop pins 83 and 85 outwardly.

The pins 83 and 85 are in the path of movement of the stop finger 81.

The stop pin 85 preferably has an inclined end face 89 for facilitating the return of the stop finger 81 as hereinafter explained.

In order to determine the initial or presetting of the longitudinal axial position of the shaft 30 an adjusting knob 92 is provided, rotatably carried on the bridge cover plate 57 and held thereon by a resilient split washer 93, a sealing washer or gasket 94 being interposed between the knob 92 and the plate 57. The knob 92 has a bit 95 which is engaged in the end slot 64 for manual turning of and longitudinal movement of the positioning head 63 as determined by the threaded engagement at 62.

The mode of operation will now be pointed out.

For free spooling, the brake control lever 75 is positioned at the free spool position, i.e. engaging the head of the stop pin 83 and urging it inwardly. In this position the cam follower pins 65 will be seated in the notches 69 and the drag washers 37 and 42 will be held apart by the action of the springs 39 and 40. No braking action will be applied under this condition. The radial handle 53 can be turned manually in a clockwise direction but is restrained from movement in a counterclockwise direction by the engagement of the dogs 23 against the shoulders 21.

If now, it is desired to apply a braking action to reduce the freedom of payout of line from the spool 35, the guide head 78 is positioned at the desired location between the stop pins 83 and 85. Greater braking force is applied by closer positioning of the guide head 78 to the stop pin 85. The braking action is accomplished by engagement of the cam faces 70 with the pins 65 to urge the bearing carrier 71, and the bearing 60 therein toward the left as seen in FIG. 2 to move the shaft 30 against the force of the spring 40, and thereby move the spool 35 toward the left to engage the drag washer 37 at the left side of the spool with the drag washer 42 mounted on the drive plate 19. The drive plate 19 is held against rotation in the braking direction by engagement of the dogs 23 with the shoulders 21. The extent of braking action will be determined by the positioning of the lever 75.

Preset of the desired braking action can be effected by rotation of the preset knob 92 which determines the positioning of the bearing 60 within the bearing carrier 61 independent of the shifting of the bearing 60 by the operation of the brake control lever 75.

With the guide head 78 positioned to engage the pin 85 and force it inwardly a full brake application will be effected and maintained. Additional braking or complete locking action can be effected by depresing the pin 85 and moving the guide head 78 thereover. The inclined end face 89 will aid in the return of the guide head 78 to the normal braking range between the pins 83 and 85 as it does not interpose any obstacle to such return.

In the brake applied position of the brake control lever 75 the radial handle 53 can be turned in a clockwise direction as seen in FIG. 1 to wind the line onto the spool 35.

A quick and positive control of the spool operation is thus provided with the spool 35 free and maintained free when the guide head 78 presses on the stop pin 83, and with preset and variable brake application controlled by the brake control lever 75 as positioned by movement of the guide head 78.

I claim:

1. A fishing reel comprising:
   a frame having side plates,
   a spool having a brake portion on one side face thereof,
   a longitudinally axially movable shaft journaled at one end in one of said side plates and on which said spool is journaled,
   a drive plate in said frame contiguous to said one of said side plates and having a braking portion engageable with said first mentioned braking portion,
   members interposed between said drive plate and said one of said side plates for preventing rotation of said drive plate in one direction,
   a positive driving slidable connection between said shaft and said drive plate,
   manually operable driving means connected to said shaft for driving said shaft, and
   means for longitudinally axially positioning said spool for free spool operation and for connection to said shaft through said drive plate,
   said means including a brake control lever movably mounted with respect to the other of said side plates,
   a guide head on said lever,
   spaced stop members engageable by said guide head, and
   operating connections between said brake control lever and said shaft for determining the longitudinal axial position of said spool,
   said stop members being resiliently urged to stop positions, and
   said stop members being movable to positions for movement of said guide head thereover.

2. A fishing reel comprising:
   a frame having side plates,
   a spool having a braking portion at one side face thereof,
   a shaft journaled at one end in one of said side plates and on which said spool is carried,
   a drive plate in said frame contiguous to one of said side plates and having a braking portion engageable with said first mentioned braking portion,
   members for preventing rotation of said drive plate in one direction,
   a positive driving connection between said shaft and said drive plate,
   driving means connected to said shaft for driving said shaft, and
   means for controlling free spool operation of said spool,
   said means including a brake control lever movably mounted with respect to one of said side plates,
   a guide head on said lever, spaced stop members engageable by said guide head, and operating connections actuated by said brake control lever for controlling the engagement of said braking portions, said stop members being resiliently urged to stop positions, and said stop members being movable to positions for movement of said guide head thereover.

3. A fishing reel comprising:
a frame having side plates,
a spool having a braking portion on one side face thereof,
a longitudinally axially movable shaft journaled at one end in one of said side plates and on which said spool is journaled,
a drive plate in said frame contiguous to said one of said side plates and having a braking portion engageable with said first mentioned braking portion,
members interposed between said drive plate and said one of said side plates for preventing rotation of said drive plate in one direction,
a positive driving slidable connection between said shaft and said drive plate,
manually operable driving means connected to said shaft for driving said shaft,
means for longitudinally axially positioning said spool for free spool operation and for connection to said shaft through said drive plate,
said means including a brake control lever movably mounted with respect to the other of said side plates,
a guide head on said lever,
spaced stop members engageable by said guide head, and
operating connections between said brake control lever and said shaft for determining the longitudinal axial position of said spool, and
means mounting at least one of said stop members for displacement by said guide head thereby.

4. A fishing reel comprising:
a frame having side plates,
a spool having a braking portion on one side face thereof,
a longitudinally axially movable shaft journaled at one end in one of said side plates and on which said spool is journaled,
a drive plate in said frame contiguous to said one of said side plates and having a braking portion engageable with said first mentioned braking portion,
members interposed between said drive plate and said one of said side plates for preventing rotation of said drive plate in one direction,
a positive driving slidable connection between said shaft and said drive plate,
manually operable driving means connecting to said shaft for driving said shaft, and
means for longitudinally axially positioning said spool for free spool operation and for connection to said shaft through said drive plate,
said means including a brake control lever movably mounted with respect to the other of said side plates,
a guide head on said lever,
spaced stop members engageable by said guide head, and
operating connections between said brake control lever and said shaft for determining the longitudinal axial position of said spool,
said stop members being resiliently urged outwardly to stop positions, and
means mounting at least one of said stop members for displacement to a position for movement of said guide head beyond a stop position initially determined by said stop members.

5. A fishing reel comprising:
a frame having side plates,
a spool having a braking portion at one side face thereof,
a shaft journaled at one end in one of said side plates and on which said spool is carried,
a drive plate in said frame contiguous to one of said side plates and having a braking portion engageable with said first mentioned braking portion,
members for preventing rotation of said drive plate in one direction,
a positive driving connection between said shaft and said drive plate,
driving means connected to said shaft for driving said shaft, and
means for controlling free spool operation of said spool,
said means including a brake control lever movably mounted with respect to one of said side plates,
a guide head on said lever,
spaced stop members engageable by said guide head, and
operating connections actuated by said brake control lever for controlling the engagement of said braking portions, and
means mounting at least one of said stop members for displacement by said guide head thereby.

6. A fishing reel comprising:
a frame having side plates,
a spool having a braking portion at one side face thereof,
a shaft journaled at one end in one of said side plates and on which said spool is carried,
a drive plate in said frame contiguous to one of said side plates and having a braking portion engageable with said first mentioned braking portion,
members for preventing rotation of said drive plate in one direction,
a positive driving slidable connection between said shaft and said drive plate,
driving means connected to said shaft for driving said shaft, and
means for controlling free spool operation of said spool,
said means including a brake control lever movably mounted with respect to one of said side plates,
a guide head on said lever,
spaced stop members engageable by said guide head, and
operating connections actuated by said brake control lever for controlling the engagement of said braking portions,
said stop members being resiliently urged outwardly to stop positions, and
means mounting at least one of said stop members for displacement by said guide head beyond a stop position initially determined by said stop members.

7. A fishing reel comprising:
a frame having side plates,
a spool having a braking portion at one side face thereof,
a shaft journaled at one end in one of said side plates and on which said spool is carried,
a member in said frame contiguous to one of said side plates and having a braking portion engageable with said first mentioned braking portion,
members for preventing rotation of said drive plate in one direction,
driving means connected to said shaft for driving said shaft, and
means for controlling free spool operation of said spool,
said means including a brake control lever movably mounted with respect to one of said side plates,
a cam member actuated by said brake control lever,
said cam member having longitudinally axially shiftable cam end face portions,
a cam follower member engaging said face portions and positioned by said cam member, a bearing for said shaft carried in said follower member, and a longitudinally axially movable member positioning said bearing and having a mounting portion in threaded engagement with said cam follower member, said last member having a portion for longitudinal axial adjustment thereof, and an adjusting member carried by one of said frame plates having a portion in engagement with said last member and an externally disposed portion for manual adjustment, said adjusting member engaging a portion of said controlling means and thereby being held against longitudinal axial movement with respect to said controlling means.

References Cited

UNITED STATES PATENTS

| 3,166,269 | 1/1965 | Veroli | 242—84.54 |
| 3,315,913 | 4/1967 | Grieten | 242—84.45 |
| 2,150,088 | 3/1939 | White | 242—84.44 |
| 2,255,703 | 9/1941 | Grieten | 242—84.44 |
| 2,417,732 | 3/1947 | Bland et al. | 242—84.46 |
| 2,531,610 | 11/1950 | Butzman | 242—84.46 |
| 3,104,075 | 9/1963 | Wood | 242—84.54 |
| 3,146,966 | 9/1964 | Dunn | 242—84.45 |

BILLY S. TAYLOR, *Primary Examiner.*